US007047108B1

(12) United States Patent
Rainier et al.

(10) Patent No.: US 7,047,108 B1
(45) Date of Patent: May 16, 2006

(54) ENHANCEMENTS TO MECHANICAL ROBOT

(75) Inventors: Rajiv Rainier, Escondido, CA (US); Milton Massey Frazier, San Marcos, CA (US); Christopher Daniel Russo, San Diego, CA (US); Christopher Peter Wieck, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 11/069,405

(22) Filed: Mar. 1, 2005

(51) Int. Cl.
*G06F 19/00* (2006.01)

(52) U.S. Cl. ...................... 700/245; 700/248; 700/249; 700/262; 700/275; 318/800; 901/1; 901/42

(58) Field of Classification Search ................ 700/245, 700/253, 257, 262, 275, 264, 248, 247, 249, 700/250; 318/800, 805; 29/783, 784; 901/1, 901/42, 10, 46; 340/522, 231, 565, 359.1, 340/359.14
See application file for complete search history.

(56) References Cited

U.S. PATENT DOCUMENTS 5,202,661 A * 4/1993 Everett et al. .............. 340/552
6,381,515 B1 * 4/2002 Inoue et al. ................ 700/245
6,459,955 B1 * 10/2002 Bartsch et al. .............. 700/245
6,493,606 B1 * 12/2002 Saijo et al. ................. 700/245
6,529,802 B1 * 3/2003 Kawakita et al. ........... 700/245
6,542,788 B1 * 4/2003 Hosonuma et al. ......... 700/245
6,650,965 B1 * 11/2003 Takagi et al. ............... 700/245
6,754,560 B1 * 6/2004 Fujita et al. ................ 700/245
6,760,646 B1 * 7/2004 Osawa ........................ 700/245
6,865,446 B1 * 3/2005 Yokono et al. ............. 700/245

OTHER PUBLICATIONS

Fujita, On activating human communications with pet-type robot AIB), 2004, IEEE, p. 18041813.*
Seiji et al., Training AIBO like a dog, 2004, IEEE, p. 431-436.*
Fujita, Digital creatures for futire entertainments robotics, 2000, IEEE, p. 801-806.*
Hasanuzzaman et al., Gesture based human-robot interaction using a frame based software platorm, 2004, IEEE, p. 2883-2888.*

* cited by examiner

*Primary Examiner*—Thomas G. Black
*Assistant Examiner*—McDieiunel Marc
(74) *Attorney, Agent, or Firm*—John L. Rogitz

(57) ABSTRACT

A mechanical robot can detect intruders using a camera or other motion sensor or aurally using a microphone, and then alert a user in response.

18 Claims, 1 Drawing Sheet

ENHANCEMENTS TO MECHANICAL ROBOT

I. FIELD OF THE INVENTION

The present invention relates generally to mechanical robots.

II. BACKGROUND OF THE INVENTION

In recent years, there has been increased interest in computerized robots such as, e.g., mechanical pets, which can provide many of the same advantages as their living, breathing counterparts. These mechanical pets are designed to fulfill certain functions, all of which provide entertainment, and also in many cases general utility, to the owner.

As an example, Sony's AIBO robot is designed to mimic many of the functions of a common household pet. AIBO's personality develops by interacting with people and each AIBO grows and develops in different way based on these interactions. AIBO's mood changes with its environment, and its mood affects its behavior. The AIBO can provide certain features and entertainment to the owner through such things as execution of certain tasks and actions based on its programming and the commands of the user. An AIBO can perform any number of functions, e.g., creating noise frequencies that resemble a dog's bark.

In general, a mechanical "robot" as used herein and to which the present invention is directed includes movable mechanical structures such as the AIBO or Sony's QRIO robot that contain a computer processor, which in turn controls electro-mechanical mechanisms such as wheel drive units and "servos" that are connected to the processor. These mechanisms force the mechanism to perform certain ambulatory actions (such as arm or leg movement).

SUMMARY OF THE INVENTION

A mechanical robot includes a body, a processor mounted on the body, and one or more electro-mechanical mechanisms controlled by the processor to cause the body to ambulate. A sensor such as a sound sensor (e.g., a microphone) and/or a motion sensor (e.g., a camera) is electrically connected to the processor, and the processor compares a sensed sound and/or image from the sensor with predetermined criteria to selectively generate an intruder alert in response. In this regard, the robot can use adaptive learning algorithms to learn from past decisions, e.g., a user can speak approvingly of "correct" intruder alert response and disapprovingly of incorrect intruder response and the robot, using, e.g., voice recognition software or tone sensors, can then correlate the action to whether it is "correct" or not using the user's input, which may also be made using a keyboard or keypad entry device on the robot. Sony' U.S. Pat. No. 6,711,469 discusses further adaptive learning principles.

In some non-limiting implementations the processor compares an image from the camera with data stored in the processor to determine whether a match is established. The intruder alert may be generated if a match is not established, i.e., if a sensed person is a stranger, or the intruder alert may be generated if a match is established if, for instance, the sensed person is correlated to a known "bad person". If desired, in the latter case the robot can include a wireless communication module and automatically contact "911" or other emergency response using conventional telephony or VoIP. The robot can also execute a non-lethal response such as emitting a shrill sound to alert nearby people.

In another aspect, a mechanical robot includes a body, a processor mounted on the body, and one or more electro-mechanical mechanisms controlled by the processor to cause the body to ambulate. Means on the robot sense a visible and/or aural disturbance and generate a signal in response. Also, means are on the robot for comparing a sensed sound and/or image represented by the signal with predetermined criteria, with means being provided on the robot for selectively generating an intruder alert in response to the means for comparing.

In still another aspect, a mechanical robot includes a body, a processor mounted on the body, and one or more electro-mechanical mechanisms controlled by the processor to cause the body to ambulate. A sensor such as a sound sensor (e.g., a microphone) and/or a motion sensor, which can be a multi-directional camera that can be preprogrammed based on user preferences and that can be accessed using a wireless module on the robot, is electrically connected to the processor. The processor compares a sensed sound and/or image from the sensor with predetermined criteria to selectively play music in response.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
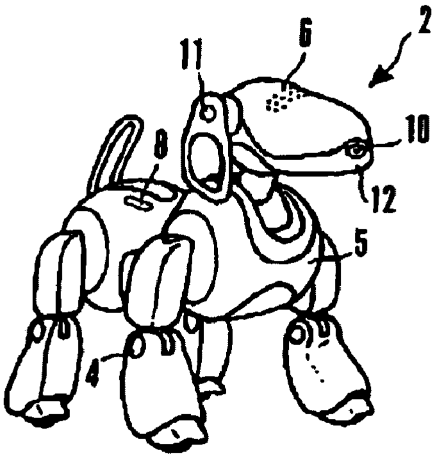
FIG. 1 is a perspective view of a non-limiting robot, schematically showing certain components.

Referring initially to FIG. 1, a mechanical, preferably battery-driven robot 2 is shown that may be embodied in a non-limiting implementation by a Sony AIBO-type or QRIO-type device, with the enhancements herein provided. The robot 2 has multiple servos 4 operating and moving extremities of a robot body 5. These servos are connected to a computer processor 6 that controls the servos using electro-magnetic signals in accordance with principles known in the art. Additionally, as set forth further below, the processor 6 may have other functions, including face recognition using face recognition principles known in other contexts.

In some non-limiting implementations an external beacon receiver 8 such as a global positioning satellite (GPS) receiver is mounted on the robot 2 as shown and is electrically connected to the processor 6. Other beacon receivers such as rf identification beacon receivers can also be used. Using information from the receiver 8, the processor 6 can determine its localization.

FIG. 1 also shows that a camera (such as a video camera) 10 is mounted on the robot 2. The camera 10 is electrically connected to the processor 6. The camera is a non-limiting example of a motion sensor. Other motion sensors such as passive infrared (PIR) sensors can be used.

As set forth further below, the camera 10 can be used as the robot's primary mode of sight. As also set forth below, as the robot 2 "roams" the camera 10 can take pictures of people in its environment and the processor 6 can determine face recognition based on the images acquired through the camera 10. A microphone 11 may also be provided on the robot 2 and can communicate with the processor 6 for sensing, e.g., voice commands and other sounds.

Additionally, the robot 2 may be provided with the ability to deliver messages from one person/user to another through an electric delivery device, generally designated 12, that is mounted on the robot 2 and that is electrically connected to the processor 6. This device can be, but is not limited to, a small television screen and/or a speaker which would deliver the optical and/or verbal message.

Figure 2:
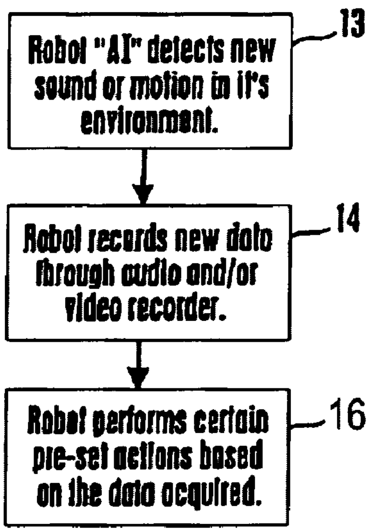
FIG. 2 is a flow chart of the overall logic.

Now referring to FIG. 2, a general logic diagram outlining the "Artificial Intelligence" process for a robot, such as AIBO, is shown. If desired, the logic may be performed in response to an owner's voice or other command, such as "start security robot".

Commencing at block 13, the robot detects a new sound (by means of the microphone 11) or motion (by means of the camera 10 or other motion sensor) in its environment. Disturbance detection can be performed by the robot by means known in the art, e.g., by simply detecting motion when a PIR or video camera is used. Further examples of disturbances are the sound of an alarm clock or a new person entering the robot's sensor range. Moving to block 14, the robot records data from the object creating the new disturbance. At block 16, the robot's processor 6 has the option of performing certain pre-set actions based on the new disturbance(s) it has detected as set forth further below.

Figure 3:
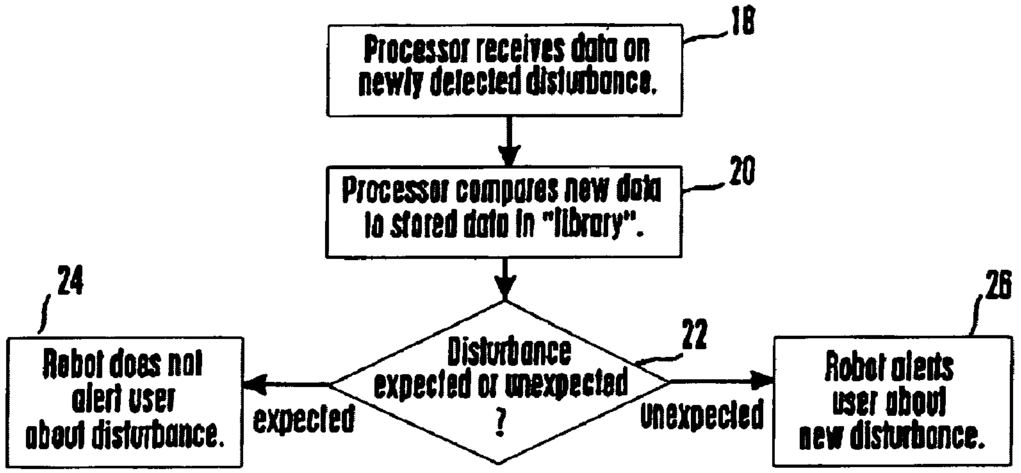
FIG. 3 is a flow chart of the alert logic.

In FIG. 3, a diagram is presented outlining the logic of the computer processor 6 on performing such pre-set actions. The processor's actions begin at block 18, where it receives collected data on the disturbance. It then compares this new data to stored data in the computer's database (called a library) at block 20. From there, decision diamond 22 denotes a choice on whether the disturbance requires activation of an alarm. For example, some disturbances such as routine clock chiming and images of family faces and/or voices can be programmed into the robot by a user, or (e.g., in the case of an owner's face that is routinely imaged) can be entered by the robot based on repetition, or may be expected based other circumstances. An alarm clock that chimes to denote the beginning of a new hour would be an example of an expected disturbance, while a new person entering the habitat may be considered unexpected.

In the latter regard, the robot can access face and/or voice recognition information and algorithms stored internally in the robot to compare an image of a person's face (or voice recording) to data in the internal database of the robot, and the robot's actions can depend on whether the face (and/or voice) is recognized. For instance, if a person is not recognized, the robot can emit an audible and/or visual alarm signal. Or again, if the person is recognized and the internal database indicates the person is a "bad" person, the alarm can be activated.

If the new data is expected or at least does not correlate to a preprogrammed "bad" disturbance, the logic proceeds to block 24, where the robot does not alert the user on the new disturbance. If the new data is not expected or otherwise indicates an alarm condition, however, the logic then moves to block 26. At block 26 the robot alerts the user about the new disturbance. A robot can perform the alert function in many ways that may include, but are not limited to, making "barking" sounds by means of the above-mentioned speaker that mimic those made by a dog, flashing alert lights on the above-mentioned display or other structure, or locating and making physical contact with the user in order to draw the user's attention.

Additionally, when an "expected" or "good" person is recognized by virtue of voice and/or face recognition, the robot may correlate the person to preprogrammed music or other information that the person or other user may have entered into the internal data structures of the robot as being favored by the person. Then, the information can be displayed on the robot, e.g., by playing the music on the above-mentioned speaker.

While the particular ENHANCEMENTS TO MECHANICAL ROBOT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A mechanical robot, comprising:

a body;

at least one processor mounted on the body;

at least one electro-mechanical mechanism controlled by the processor to cause the body to ambulate; and a sensor selected from the group consisting of: a sound sensor, and a motion sensor, the sensor being electrically connected to the processor, wherein the processor undertakes logic including comparing a sensed sound and/or image from the sensor with predetermined criteria and selectively generating an intruder alert in response thereto, at least one predetermined criterion being a sound of a clock at a predetermined time of day, the intruder alert not being generated in response thereto.

2. The robot of claim 1, wherein the sensor is a microphone.

3. The robot of claim 1, wherein the sensor is a camera.

4. The robot of claim 3, wherein the processor compares an image from the camera with data stored in the processor to determine whether a match is established.

5. The robot of claim 4, wherein the intruder alert is generated if a match is not established.

6. The robot of claim 4, wherein the intruder alert is generated if a match is established.

7. A mechanical robot, comprising:

a body;

at least one processor mounted on the body;

at least one electro-mechanical mechanism controlled by the processor to cause the body to ambulate;

means on the robot for sensing a visible and/or aural disturbance and generating a signal in response thereto;

means on the robot for comparing a sensed sound and/or image represented by the signal with predetermined criteria;

means on the robot for correlating a sensed image to a person, the person being associated with preprogrammed audio and/or image data; and means on the robot for playing the audio and/or image data in response to the means for correlating.

8. The robot of claim 7, wherein the means for comparing and means for selectively generating are established by logic executable by the processor.

9. The robot of claim 7, wherein the means for sensing is a microphone.

10. The robot of claim 7, wherein the means for sensing is a camera.

11. The robot of claim 10, wherein the processor compares an image from the camera with data stored in the processor to determine whether a match is established.

12. The robot of claim 11, wherein the intruder alert is generated if a match is not established.

13. The robot of claim 11, wherein the intruder alert is generated if a match is established.

14. A mechanical robot, comprising:

a body;

at least one processor mounted on the body;

at least one electro-mechanical mechanism controlled by the processor to cause the body to ambulate; and a sensor selected from the group consisting of: a sound sensor, and a motion sensor, the sensor being electrically connected to the processor, wherein the processor undertakes logic including comparing a sensed sound and/or image from the sensor with predetermined criteria and selectively playing music in response thereto.

15. The robot of claim 14, wherein the sensor is a microphone.

16. The robot of claim 14, wherein the sensor is a camera.

17. The robot of claim 16, wherein the processor compares an image from the camera with the predetermined criteria to determine whether a match is established.

18. The robot of claim 17, wherein the music is played if a match is established, the music being correlated to the predetermined criteria.

* * * * *